(12) United States Patent  
Park et al.

(10) Patent No.: US 7,379,231 B2  
(45) Date of Patent: May 27, 2008

(54) FERROELECTRIC LIGHT CONTROL DEVICE

(75) Inventors: Yeonjoon Park, Yorktown, VA (US); Sang H. Choi, Poquoson, VA (US); Glen C. King, Yorktown, VA (US); Jae-Woo Kim, Newport News, VA (US); James R. Elliott, Jr., Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 64 days.

(21) Appl. No.: 11/470,771

(22) Filed: Sep. 7, 2006

(65) Prior Publication Data

US 2008/0074723 A1  Mar. 27, 2008

(51) Int. Cl.  
*G02F 1/00* (2006.01)  
*G02F 1/03* (2006.01)

(52) U.S. Cl. ...................................... 359/321; 359/245
(58) Field of Classification Search ................ 349/133, 349/171; 359/248, 251, 252, 254, 255, 256, 359/321, 322; 385/2, 140  
See application file for complete search history.

(56) References Cited

U.S. PATENT DOCUMENTS 3,666,666 A * 5/1972 Haertling ............. 252/62.9 PZ

* cited by examiner

*Primary Examiner*—David N Spector  
(74) *Attorney, Agent, or Firm*—Linda B. Blackburn; Barry V. Gibbens

(57) ABSTRACT

A light control device is formed by ferroelectric material and N electrodes positioned adjacent thereto to define an N-sided regular polygonal region or circular region therebetween where N is a multiple of four.

13 Claims, 6 Drawing Sheets

FERROELECTRIC LIGHT CONTROL DEVICE

ORIGIN OF THE INVENTION

The invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to light control devices. More specifically, the invention is a solid-state light control device using ferroelectric material.

2. Description of the Related Art

Light control is conventionally achieved with one or more geometric optical components such as lenses, mirrors, polarizers, beamsplitters, and gratings. Frequently, some type of motorized control is coupled to the optical components in order to adjust light control attributes of the optical components). Such motorized control can include conventional motor/actuators and "micro-electro-mechanical systems" (MEMS). However, motorized light control devices are sensitive to vibration and acceleration effects. Further, the time required to adjust conventional optical components may be too slow for some applications.

SUMMARY OF THE INVENTION

Accordingly, it is an object of the present invention to provide a light control device.

Another object of the present invention is to provide a light control device that is insensitive to vibration and/or acceleration effects.

Another object of the present invention is to provide a light control device whose light control attributes are readily changed.

Other objects and advantages of the present invention will become more obvious hereinafter in the specification and drawings.

In accordance with the present invention, a light control device is formed by at least one multi-layer element defined by a layer of ferroelectric material and a layer of electrodes. The layer of electrodes comprises N electrodes electrically isolated from one another and positioned to define an N-sided regular polygonal region or circular region therebetween where N is a multiple of 4. The electrodes are used to establish an electric field orientation adjacent to the polygonal region. The electric field orientation and the thickness of the ferroelectric material define optical transmission properties for the polygonal or circular region of the ferroelectric material.

DETAILED DESCRIPTION OF THE INVENTION

Figure 1:
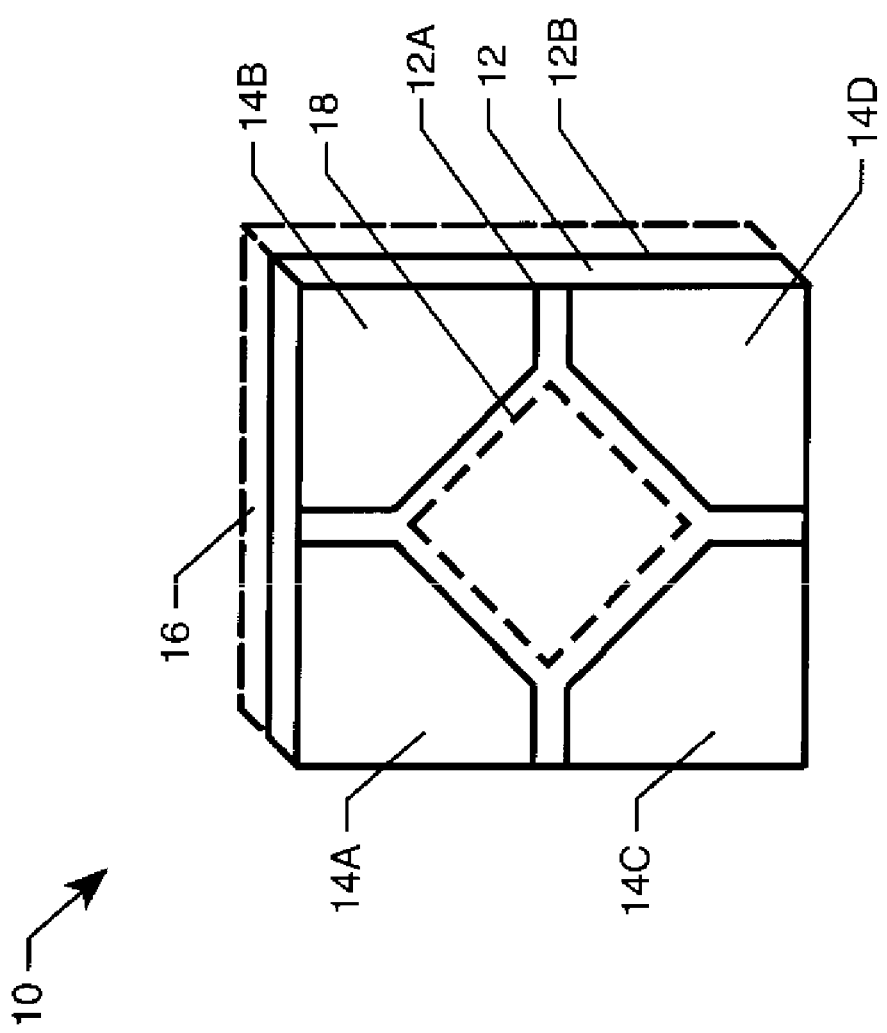
FIG. 1 is a schematic view of a single-element light control device in accordance with an embodiment of the present invention.

Referring now to the drawings and more particularly to FIG. 1, a single-element light control device in accordance with an embodiment of the present invention is shown and is referred generally by numeral 10. Light control device 10 is a solid state device with no moving parts that can be used in a wide variety of applications, the choice of which is not a limitation of the present invention.

Light control device 10 is a multi-layer device with the primary optical element being a layer 12 of ferroelectric material. Typically, layer 12 is of constant thickness in at least the region thereof (e.g., region 18 in the illustrated example as will be explained further below) that will be exposed to light that is to be controlled. Suitable ferroelectric materials include, but are not limited to, barium titanate ($BaTiO_3$), strontium barium titanate ($SrBaTiO_3$), lithium niobate ($LiNbO_3$), and potassium dihydrogen phosphate (KDP). These materials are suitable due to their relatively strong ferroelectricity where a permanent electric field polarization and hysteresis can be induced by an electric field. That is, when these materials are immediately adjacent to an electric field, the material's crystal domain structure changes to become uniquely polarized with a permanent electric dipole moment. This situation will be explained with the aid of FIGS. 2A and 2B.

Figure 2A:
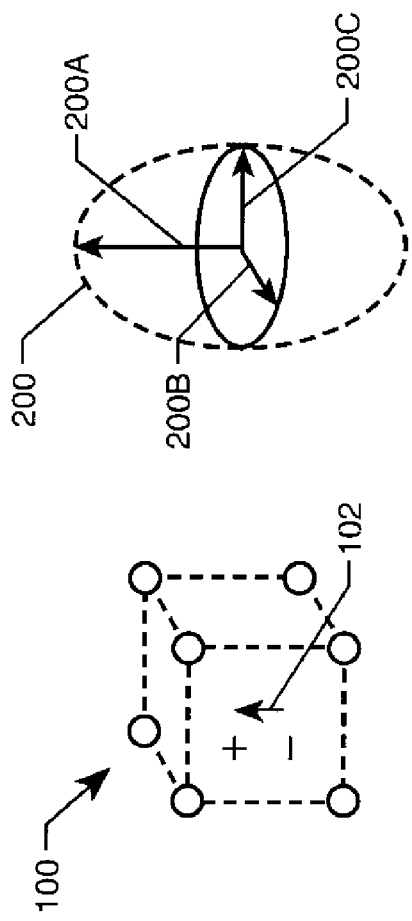
FIG. 2A is a graphic depiction of a ferroelectric material crystal structure and its non-circular refractive index ellipsoid.

FIG. 2A illustrates a crystal structure 100 of an exemplary ferroelectric material and its associated index of refraction ellipsoid 200. Crystal structure 100 has its electric dipole moment indicated by arrow 102. Since ferroelectric materials have a similar crystal structure to that of anisotropic materials, ferroelectric materials exhibit birefringence in accordance with differing ordinary ($n_o$) and extraordinary ($n_e$) indexes of refraction. In this example, the magnitude of these indexes define non-circular index ellipsoid 200 with the extraordinary axis 200A of ellipsoid 200 being aligned with dipole moment 102 while the ordinary axes 200B and 200C are orthogonal to one another and extraordinary axis 200A. In general, the direction and magnitude of the ordinary axis and extraordinary axis are determined by solving the electro-optic tensor of the ferroelectric material using the applied electric field's strength and direction.

When light enters a material with these properties, the light's photons, whose polarization is parallel to ordinary axes 200B and 200C, are subject to refraction governed by index $n_o$, while the photons whose polarization is parallel to extraordinary axis 200A are subject to refraction governed by index $n_e$. The photons with intermediate polarization directions are decomposed into two vector components along the slow and fast optical axes according to their angles with the ordinary and extraordinary optical axes. For example, $BaTiO_3$ has an ordinary index of refraction $n_o=2.4727$ and an extraordinary index of refraction $n_e=2.4114$ when the light has a wavelength of 532 nanometers.

Figure 2B:
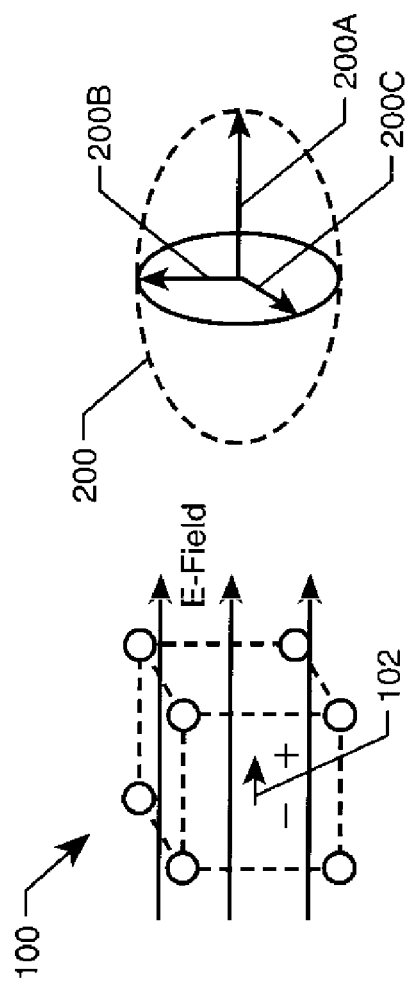
FIG. 2B is a graphic depiction of the ferroelectric material crystal structure in an electric field that changes the crystal's dipole moment and the resulting re-orientation of its non-circular refractive index ellipsoid.
Figure 3A:
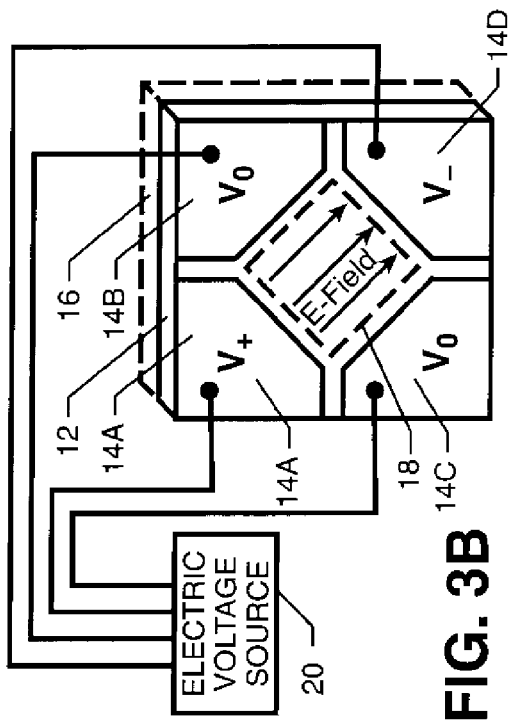
FIG. 3A is a schematic view of the light control device of FIG. 1 coupled to an electrical energy source that applies voltage levels thereto in accordance with an embodiment of the present invention.
Figure 3B:
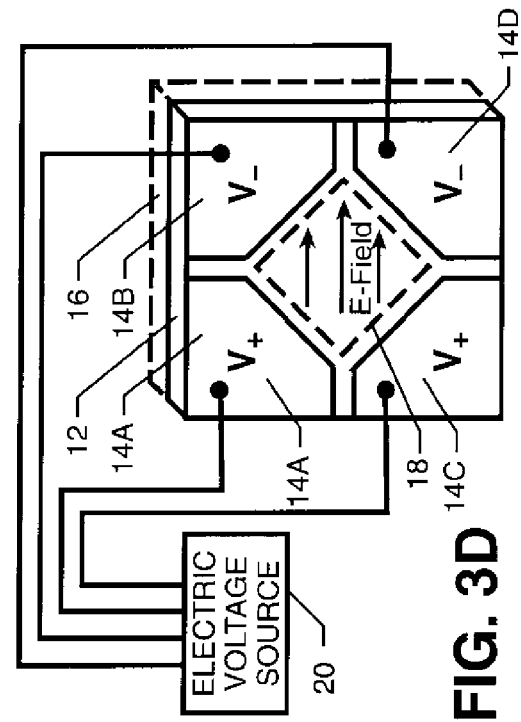
FIG. 3B is a schematic view of the light control device of FIG. 1 coupled to an electrical energy source that applies voltage levels thereto in accordance with another embodiment of the present invention.
Figure 3C:
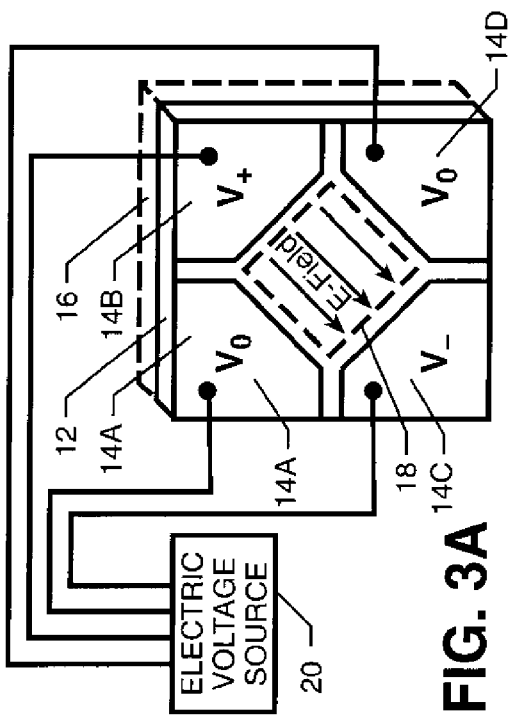
FIG. 3C is a schematic view of the light control device of FIG. 1 coupled to an electrical energy source that applies voltage levels thereto in accordance with another embodiment of the present invention.
Figure 3D:
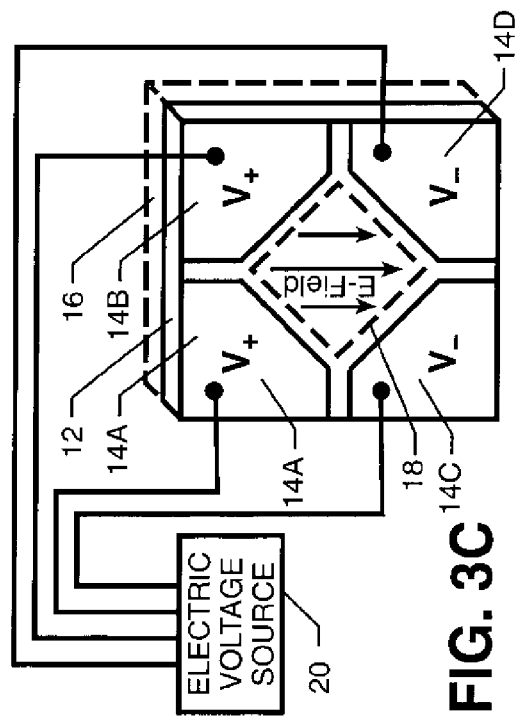
FIG. 3D is a schematic view of the light control device of FIG. 1 coupled to an electrical energy source that applies voltage levels thereto in accordance with another embodiment of the present invention.

FIG. 2B illustrates what happens to the crystal's dipole moment 102 when exposed to an immediately adjacent electric field E ("E-field"). For example, when the E-field is provided as shown, the orientation of dipole moment 102 and extraordinary axis 200A are re-oriented to be aligned with the E-field. As a result, the way that the material will refract incoming light photons will change accordingly. In general, the response of the index ellipsoid will be determined by the components of the ferroelectric material's electro-optic tensor.

Referring again to FIG. 1, light control device 10 takes advantage of these properties of ferroelectric materials by providing a number of electrodes (i.e., four are shown in the illustrated example) 14A-14D adjacent to and typically on layer 12. More specifically, electrodes 14A-14D are positioned on a planar surface 12A of two major opposing planar surfaces 12A/12B of layer 12 as shown. Although not required (as evidenced by its dashed line inclusion in light control device 10), an optical material layer 16 can be positioned adjacent to the other major planar surface 12B. Optical material layer 16 could be a transparent material or a reflective material depending on the application requirements.

Electrodes 14A-14D can be coupled to layer 12 in ways that would be well understood in the art. In the illustrated embodiment, electrodes 14A-14D are (i) spaced apart from one another such that they are electrically isolated from one another, and (ii) shaped to define a square region (referred by dashed line box 18) therebetween. Region 18 forms the optical transmission region of light control device 10. Light impinging on region 18 is refracted in accordance with the established optical properties of layer 12. The refracted light can then be transmitted or reflected depending on the presence or type of layer 16.

To establish or change the birefringence of layer 12, electrodes 14A-14D are coupled to an electric voltage source in a way that creates an electric field orientation between electrodes 14A-14D adjacent to layer 12 to thereby establish/change the ferroelectric material's dipole moment orientation and its associated refractive index ellipsoid. Light control device 10 can retain its optical properties after the applied electric field has been removed due to the hysteresis of ferroelectric material layer 12. These properties can be renewed or changed as needed by application of the appropriate electric voltage. By way of example, several embodiments of possible electric field orientations are shown in FIGS. 3A-3D where an electric voltage source 20 is coupled to electrodes 14A-14D in each embodiment. The relative voltage levels are indicated on electrodes 14A-14D where $V_+$ indicates a positive voltage, $V_-$ indicates a negative voltage, and $V_o$ indicates an intermediate voltage between $V_+$ and $V_-$. The resulting F-field orientation is shown in each example.

The advantages of the present invention are numerous. The solid-state light control device has no moving parts and is readily adjustable via application of electrical energy. The device can be sized/shaped for a variety of applications. The thickness of the ferroelectric material layer can be matched to application requirements. For example, a quarter wave plate can be constructed by making the thickness of the ferroelectric material layer satisfy the relationship:

$$\text{Thickness}=N^*[\lambda/(4^*(n_e-n_o))]$$

where N is an odd number and λ is the wavelength of light that will impinge on the light control device.

Figure 4:
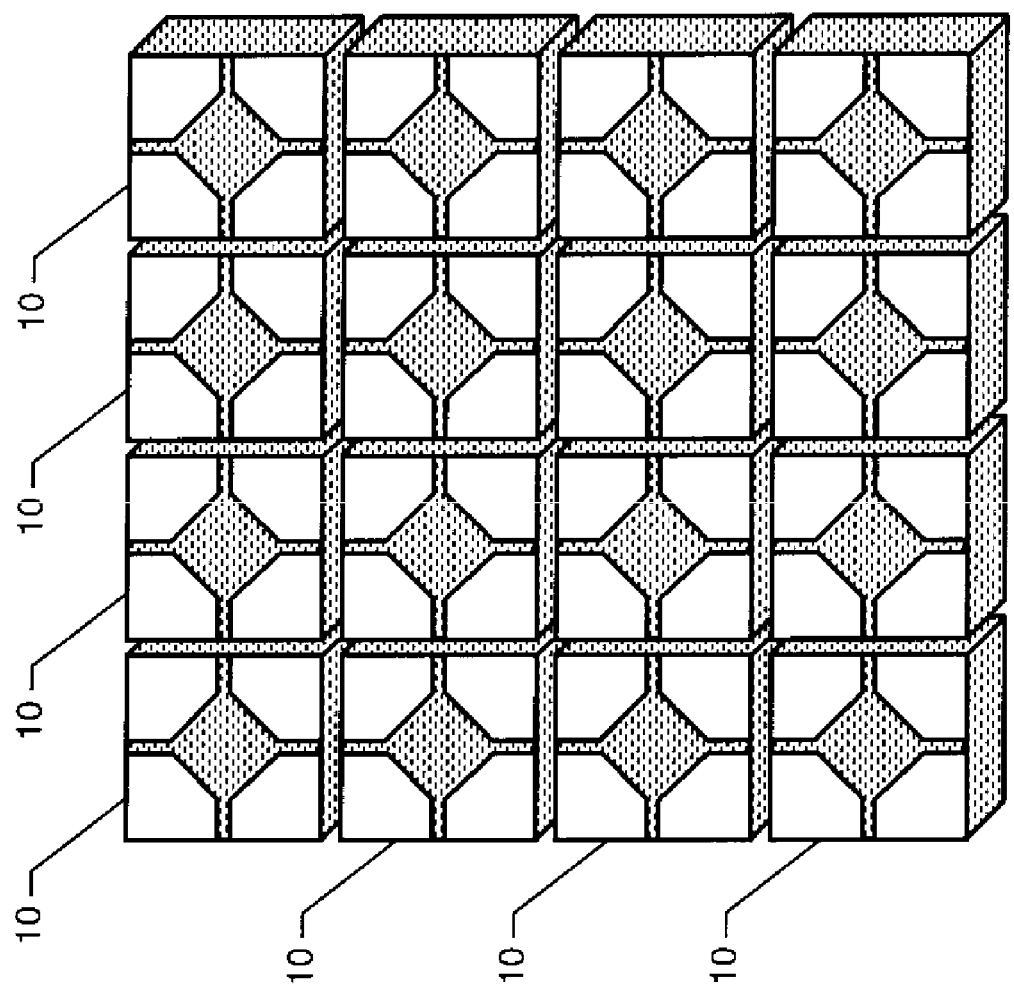
FIG. 4 is a schematic view of an array of single-element light control devices in accordance with another embodiment of the present invention.

Although the invention has been described relative to a specific embodiment thereof, there are numerous variations and modifications that will be readily apparent to those skilled in the art in light of the above teachings. For example, a number of the above-described single-element light control devices 10 can be arranged in a two-dimensional array as illustrated in FIG. 4. For clarity of illustration, the electric voltage source(s) are not shown. However, it will be readily apparent to one of ordinary skill in the art that each light control device 10 could be uniquely designed and controlled to tailor the output of the array.

Figure 5:
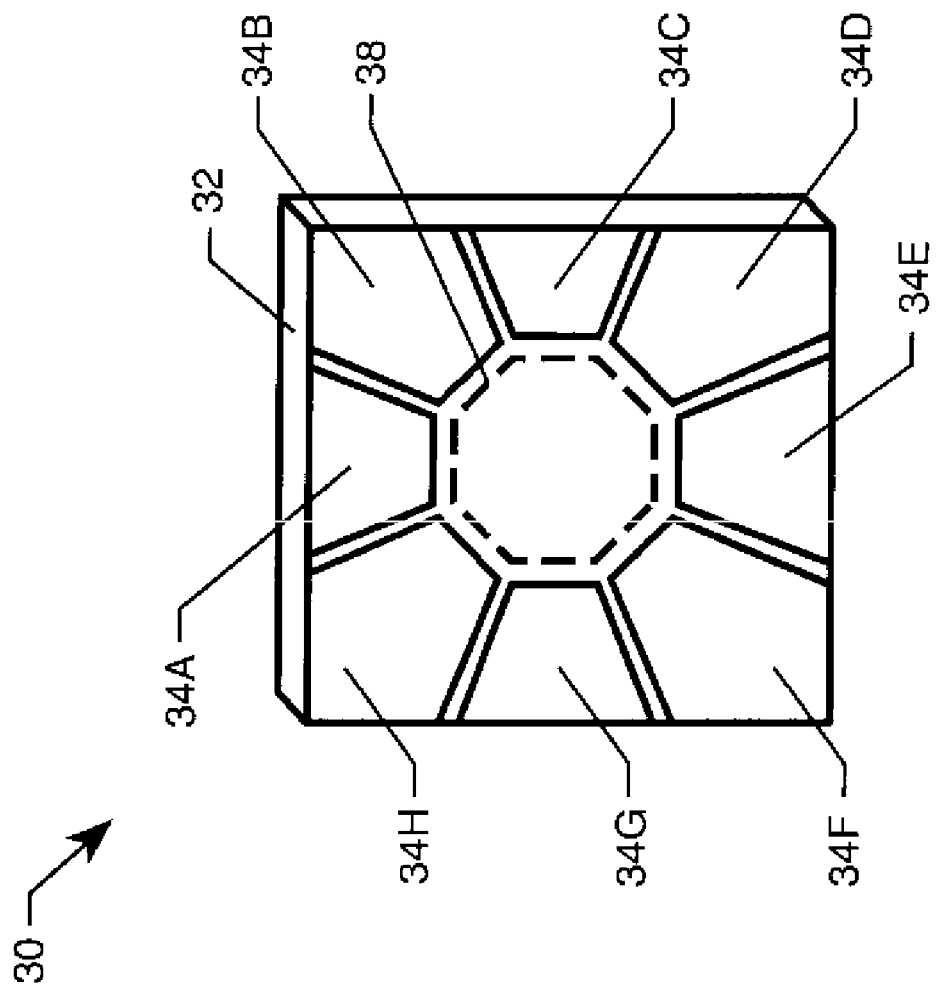
FIG. 5 is a schematic view of a single-element light control device having an octagonal electrode arrangement in accordance with another embodiment of the present invention.

Furthermore, the present invention is not limited to the construction of light control devices having square optically operative regions (i.e., region 18). In general, the optically operative region of the ferroelectric material should be a regular polygonal region having N equal sides where N is a multiple of four. Accordingly, FIG. 5 illustrates another light device 30 having ferroelectric material layer 32 and eight electrodes 34A-34H arranged to define an octagonal region 38. The precision of the E-field orientation increases with N.

Figure 6:
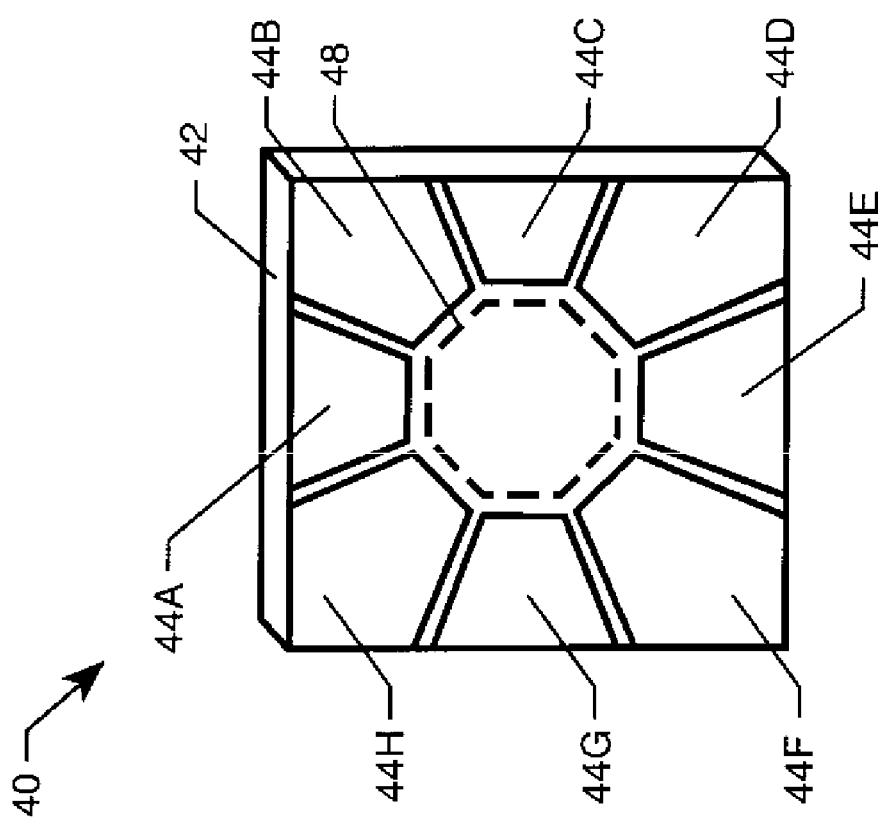
FIG. 6 is a schematic view of a single-element light control device having a circular electrode arrangement in accordance with another embodiment of the present invention.

Still further, the optically operative region of the ferroelectric material could be circular as governed by the shapes of the spatially-separated electrodes. Accordingly, FIG. 6 illustrates another light device 40 having ferroelectric material layer 42 and, for example, eight electrodes 44A-44H arranged to define a circular region 48. It is therefore to be understood that, within the scope of the appended claims, the invention may be practiced other than as specifically described.

What is claimed as new and desired to be secured by Letters Patent of the United States is:

The invention claimed is:

1. A light control device, comprising:
   a layer of ferroelectric material having first and second planar surfaces opposing one another; and
   a plurality of electrodes positioned adjacent to said first planar surface and electrically isolated from one another to define an N-sided region therebetween where N is a multiple of 4.

2. A light control device as in claim 1 further comprising a layer of transparent material adjacent to said second planar surface.

3. A light control device as in claim 1 further comprising a layer of reflective material adjacent to said second planar surface.

4. A light control device as in claim 1 further comprising means for applying electrical energy to said electrodes in order to establish a dipole moment orientation for said region of said ferroelectric material.

5. A light control device as in claim 1 wherein said layer of ferroelectric material is of constant thickness.

6. A light control device as in claim 1 wherein said region comprises a regularly-shaped polygon.

7. A light control device comprising at least one multi-layer element defined by a layer of ferroelectric material and a layer of electrodes coupled to said layer of ferroelectric material, said layer of electrodes comprising N electrodes electrically isolated from one another and positioned to define a regularly-shaped region therebetween where N is a multiple of 4.

8. A light control device as in claim 7 wherein each said element further comprises a layer of transparent material adjacent to said ferroelectric material and aligned with said region wherein light passing through said region subsequently passes through said transparent material.

9. A light control device as in claim 7 wherein each said element further comprises a layer of reflective material adjacent to said ferroelectric material and aligned with said region wherein light passing through said region is subsequently reflected by said reflective material.

10. A light control device as in claim 7 further comprising means for applying electrical energy to selected ones of said N electrodes to control dipole moment orientation in said region of said ferroelectric material.

11. A light control device as in claim 7 wherein said layer of ferroelectric material is of constant thickness.

12. A light control device as in claim 7 wherein said region is selected from the group consisting of a regularly-shaped polygon and a circle.

13. A light control device comprising:

a layer of ferroelectric material of constant thickness having first and second planar surfaces opposing one another;

means coupled to said first planar surface for establishing an electric field orientation adjacent to an exposed region of said ferroelectric material wherein said electric field orientation and said constant thickness of said ferroelectric material define optical transmission properties for said exposed region; and a layer of reflective material adjacent to said second planar surface and aligned with said exposed region.

\* \* \* \* \*